United States Patent [19]

Longley et al.

[11] 4,333,833
[45] Jun. 8, 1982

[54] IN-LINE DISINFECTANT CONTACTOR

[75] Inventors: Karl E. Longley, San Antonio, Tex.; Brian Ratigan, Philadelphia; James W. Davis, New Britain, both of Pa.

[73] Assignee: Fischer & Porter Co., Warminster, Pa.

[21] Appl. No.: 903,596

[22] Filed: May 8, 1978

[51] Int. Cl.³ .............................................. C02F 1/68
[52] U.S. Cl. ................................. 210/198.1; 210/754; 261/DIG. 75
[58] Field of Search ...................... 210/62, 63 R, 63 Z, 210/198 R, 220; 261/DIG. 75; 366/10, 101

[56] References Cited

U.S. PATENT DOCUMENTS

| | | | |
|---|---|---|---|
| Re. 25,095 | 12/1961 | Stenberg | 210/198 R X |
| 2,012,406 | 8/1935 | Savell | 210/198 R |
| 2,382,734 | 8/1945 | Marks | 210/62 X |
| 3,282,227 | 11/1966 | Nielsen | 261/DIG. 75 |
| 3,996,139 | 12/1976 | Prince et al. | 261/DIG. 75 |
| 4,019,983 | 4/1977 | Mandt | 261/DIG. 75 |
| 4,049,552 | 9/1977 | Arff | 261/DIG. 75 |

FOREIGN PATENT DOCUMENTS

| | | | |
|---|---|---|---|
| 1517502 | 11/1970 | Fed. Rep. of Germany | 261/DIG. 75 |
| 1377571 | 12/1964 | France | 261/DIG. 75 |
| 255859 | 3/1970 | U.S.S.R. | 210/62 |

Primary Examiner—Robert H. Spitzer
Attorney, Agent, or Firm—Michael Ebert

[57] ABSTRACT

An in-line contactor adapted to bring about intimate contact between a disinfectant and a wastewater stream to produce a reaction between the disinfectant and pathogens effecting kills in a manner minimizing unwanted side effects. The wastewater stream is pumped through the successive stages of the contactor, the first of which is an input section having a converging nozzle that projects the stream at high velocity into a throat. The throat feeds the stream in a highly turbulent state through a mixing section, the resultant vacuum created within the throat acting to draw a disinfectant such as aqueous or gaseous chlorine from a disinfectant supply into the mixing section where it is thoroughly intermingled with the turbulent stream before the stream is discharged from the contactor through a diverging pressure-recovery output section.

2 Claims, 3 Drawing Figures

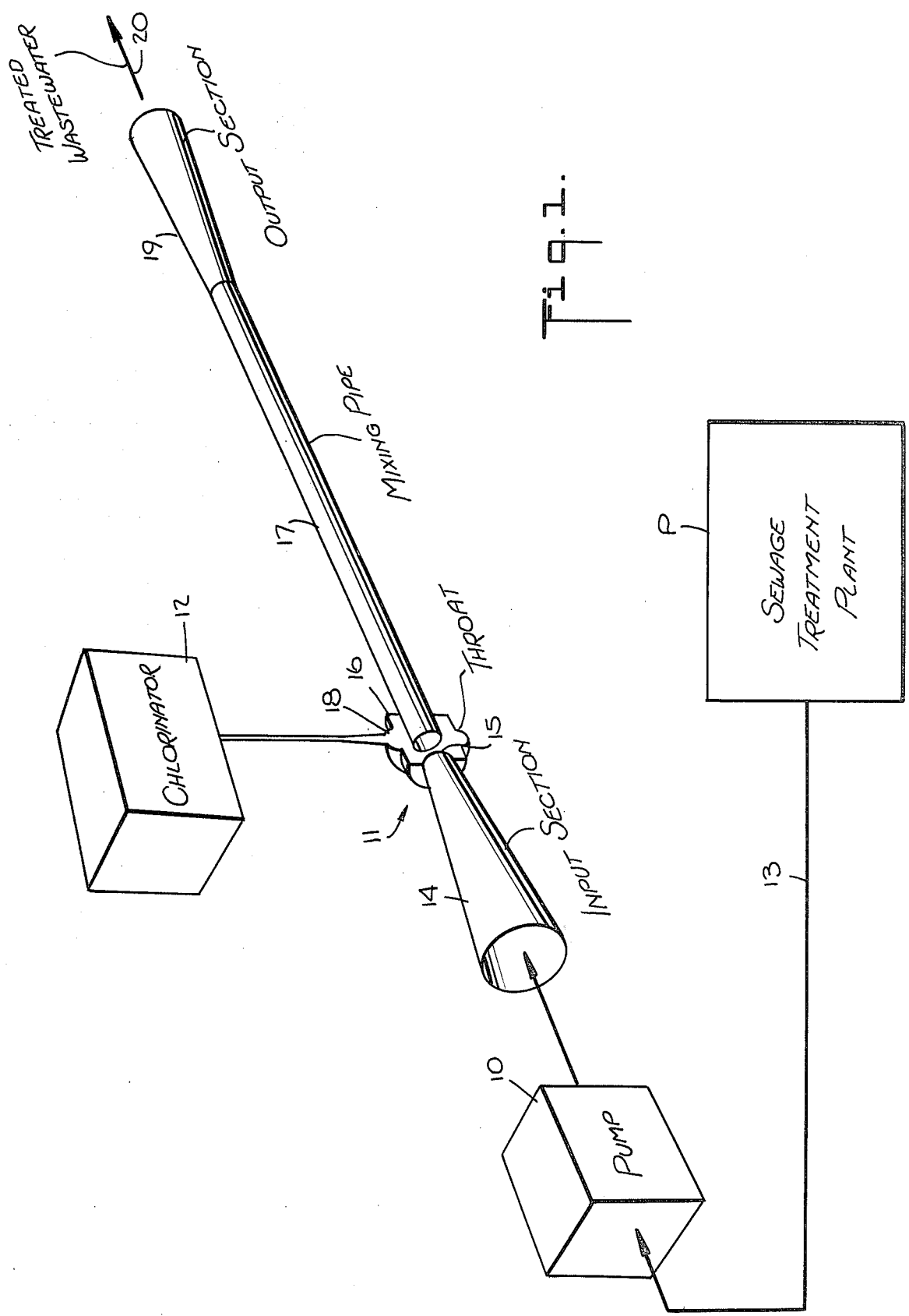

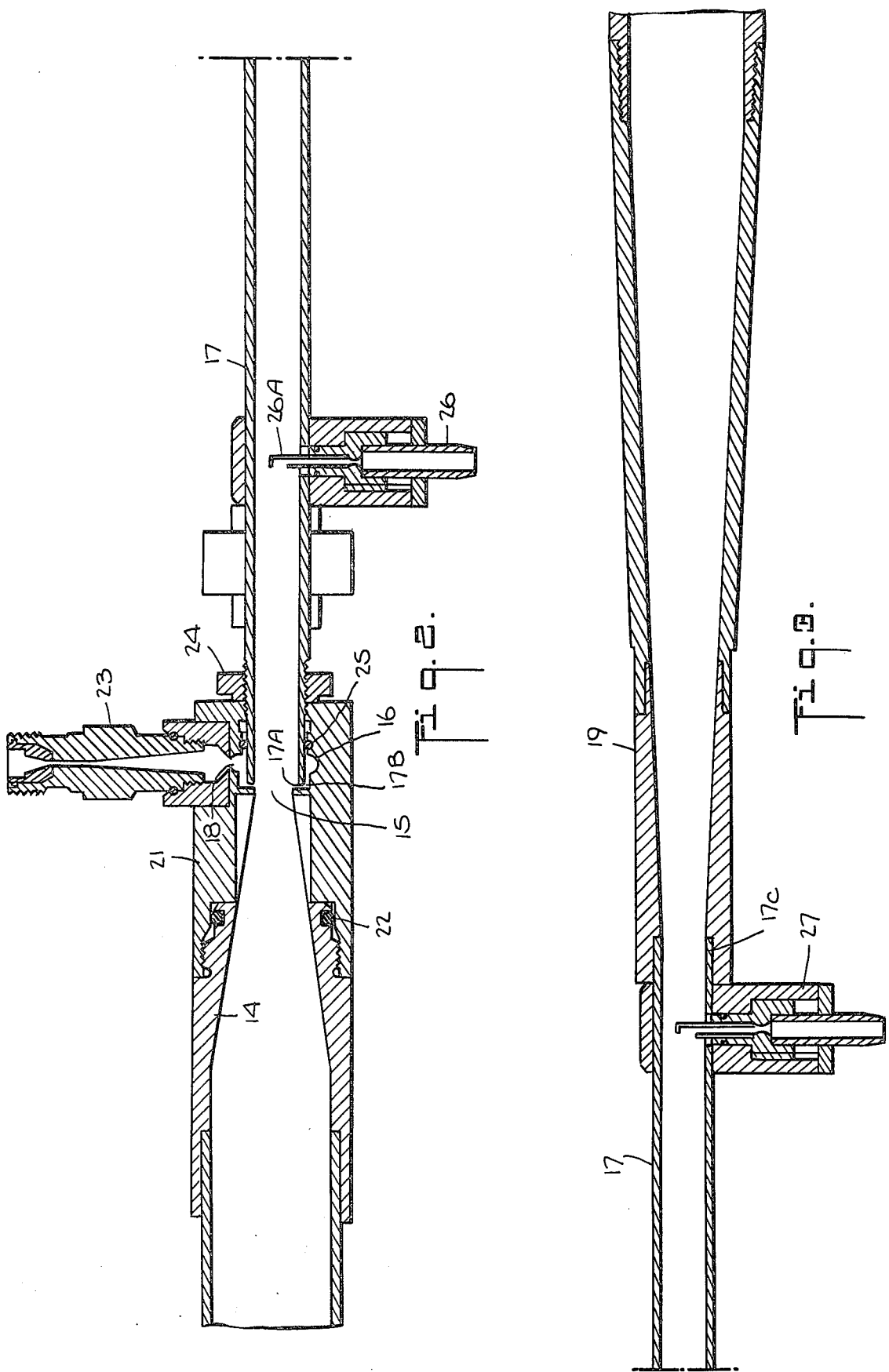

IN-LINE DISINFECTANT CONTACTOR

BACKGROUND OF INVENTION

This invention relates generally to techniques for intermingling a disinfectant with wastewater to be treated to kill pathogens therein, and more particularly to an in-line disinfectant contactor adapted to enhance contact between the disinfectant and the water to effect a more rapid and efficient disinfection activity than has heretofore been possible.

Chlorination is widely used to purify water supplies. In practice, chlorine is introduced at a selected point in the water supply system, flow then taking place into a tank or through a region of flow which is sufficient for the chlorine to act effectively on the contaminants present in the water to produce a disinfecting action. The amount of chlorine added to the water is referred to as the "dosage," and is usually expressed as milligrams per liter (mg/l) or parts per million (ppm). The amount of chlorine used up or consumed by bacteria, algae, organic compounds and some inorganic substances, such as iron or manganese, is designated as the "demand."

Since many of the reactions with chlorine are not instantaneous, but require time to reach completion, chlorine demand is time-dependent. The amount of chlorine remaining in the water at the time of measurement is referred to as the "residual." Residual is therefore determined by the demand subtracted from the dosage. Inasmuch as chlorine demand is time-dependent, this dependency is likewise true of chlorine residual.

When chlorine dissolves in water, a mixture of hypochlorous and hydrochloric acids is formed. The hydrochloric acid always completely dissociates into hydrogen and chloride ions, whereas the hypochlorous acid only partially dissociates into hydrogen and hypochlorite ions as a function of the pH of the water. In either the hypochlorous or hypochlorite form, chlorine is called "free chlorine residual." Free chlorine residual has a highly effective killing power toward bacteria.

Should the chlorinated water contain ammonia or certain amino (nitrogen-based) compounds, as is invariably the case with sewage, then additional compounds, called chloramines, are created. Chloramines may occur almost instantaneously, depending mainly on water pH. Though several reactions are possible between hypochlorous acid and ammonia, chloramines collectively are referred to as "combined chlorine residual." This combined chlorine residual has a much lower bactericidal effect than free chlorine residual.

Domestic wastewater is typically high in ammonia, the ammonia resulting primarily from hydrolysis of urea. Almost all of the inorganic nitrogen formed in solutions that enter a waste treatment plant is normally in the least oxidized, ammonia form. In conventional secondary waste treatment, a portion of the ammonia will be completely nitrified to nitrite, some ammonia will be only partially nitrified to nitrite, and a portion will remain as ammonia.

When sufficiently high chlorine dosages are applied to waters containing ammonia, different reactions will occur, resulting in the destruction of the ammonia and the formation of free chlorine residual. Thus, for water containing a known amount of ammonia, if one starts with a chlorine dosage which is low, chloramines will be formed resulting in a combined chlorine residual whose bactericidal effect is relatively weak.

As the dosage is raised, the amount of combined chlorine residual produced also increases, until a peak is reached when all of the free ammonia is used up in the formation of chloramine. And as the dosage is elevated beyond the level at which the combined chlorine residual peaks, destruction of the chloramines, which are unstable, takes place until a breakpoint is reached indicating that chloramine destruction is at its maximum. At breakpoint, the first persistent appearance of free chlorine occurs. Thus by using a chlorine dosage sufficient to attain the breakpoint state, one is able to get rid of virtually all ammonia and most of the chloramines.

The virtues of chlorination have long been appreciated, but it is only recently that the hazards involved in excessive chlorination have been publicly recognized. In studies carried out in the chlorinated water supply of the city of New Orleans, it was found that the levels of chlorination were such as to release carcinogenic agents dangerous to the community. The results of this study are reported in the article by R. A. Harris, "The Implication of Cancer Causing Substances in Mississippi River Water," published by the Environmental Defense Fund, Washington, D.C., Nov. 6, 1974.

Shortly after this study appeared, Public Law 93-523 went into effect authorizing the EPA administrator to conduct a comprehensive study of public water supplies "to determine the nature, extent, sources of, and means of control of contamination by chemicals or other substances suspected of being carcinogens."

Subsequently, Jolley ("Chlorine-containing Organic Constituents in Chlorinated Effluents"—Journal of the Water Pollution Control Fed., 47:601–618 (1975)) reported the presence of forty-four chloro-organic compounds in a chlorinated secondary wastewater effluent.

May applications exist for chlorine in wastewater treatment facilities, such as for odor control of raw sewage and the control of hydrogen sulfide in sewers, but its most universal application lies in wastewater treatment facilities for the terminal disinfection of the treated plant effluent just before the effluent is discharged.

The formation of compounds suspected of being carcinogenic as a result of the reaction of chlorine with hydrocarbons in wastewater is by no means the only unwanted side effect caused by the traditional disinfection process, for chlorine residuals in wastewater give rise to an environment that is toxic to aquatic organisms. Though chlorine is a highly effective biocide for undesirable organisms, it is also deadly to fish and other forms of aquatic life and therefore has a deleterious impact on fresh water eco-systems.

In general, wastewater disinfection practice has heretofore largely disregarded these unwanted side effects, for this practice focused on the two factors thought to be of greatest significance in attaining adequate disinfection; namely, the residual of the disinfectant and its contact time with the sewage. This practice has brought about the use of massive doses of disinfectant in long serpentine channels serving to prolong contact time. While this produced the desired degree of disinfection, it also aggravated unwanted side effects.

In order to obtain adequate disinfection with minimal unwanted side effects, the now-recognized goal is to carry out rapid, intimate mixing of the chlorine solution with the wastewater stream in the shortest possible period. Ideally, the mixing time should be a fraction of a second. With a view to attaining this goal, a jet disinfection technique has been developed to accelerate the mixing activity. This technique is described in the *Penberthy Jet Disinfection Technical Bulletin* published in 1977 by the Pentech Division of Houdaille Industries, Inc. of Cedar Falls, Iowa.

In the jet disinfection technique, the influent to be treated is pumped into a jet nozzle to which a chlorine supply is coupled, the nozzle projecting the influent into a reactor tube into which the chlorine is drawn by induced vacuum. Because of the highly turbulent field existing within the reaction tube, the disinfectant is thoroughly dispersed throughout the entire effluent flow and for an instant subjects the bacteria and viruses to an acutely toxic environment. The rapid and intimate contact of disinfectant with the wastewater brings chlorine in its most potent form to react on the pathogens, thereby promoting rapid kills. With higher kills, the long detention time of a conventional system is markedly reduced.

The most reactive species of chlorine is molecular chlorine, this being available in either chlorine gas or in a highly concentrated solution of aqueous chlorine. By introducing the molecular chlorine to the disinfection site as quickly as possible, unwanted side effects do not have time to occur. The intimate contact brought about by the jet disinfection technique shortens the contact time and reduces chlorine usage.

The overall operating expense of a chlorine disinfection system may be broken down into the respective costs of chlorine usage, water usage and power usage. Water usage depends on the carrier water required to create the necessary chlorine-water solutions, and since water usage is a function of chlorine demand, the lower the required chlorine dosage, the less carrier water entailed.

In a typical jet disinfection installation, a sealed baffle is placed across the wastewater channel to direct all channel flow through a plurality of reactor tubes. A portion of the incoming wastewater flow is internally pumped into the jet nozzle associated with each reactor tube, the chlorine being carried into the jet by induced vacuum. Thus, in addition to the external pump requirements for the channel, each jet nozzle assembly requires its own internal pump, thereby adding substantially to the overall cost of the system and creating maintenance problems.

While the present invention will be described in connection with chlorine as a disinfectant for wastewater, it is to be understood that the invention is also applicable to other disinfecting agents such as chlorine dioxide, bromine chloride and ozone.

SUMMARY OF INVENTION

In view of the foregoing, the main object of this invention is to provide an in-line contactor for disinfecting a wastewater stream in which aqueous or gaseous molecular chlorine or other disinfectant is educed into and thoroughly intermingled with the stream to afford a highly efficient and intimate mixing action promoting kills in a very brief period, thereby minimizing unwanted side effects. The invention is also applicable to raw and filtered water streams.

More particularly, it is an object of this invention to provide an in-line contactor of the above-noted type in which an external pump which feeds wastewater to be treated through the contactor represents the sole source of power, the pumping action creating a vacuum within the contactor to educe disinfectant from a supply thereof to be intermingled with the stream to kill the pathogens therein at a rapid rate.

Yet another object of the invention is to provide an in-line contactor of simple, efficient and reliable design which may be manufactured and installed at relatively low cost and which requires virtually no maintenance, for no internal pumps are entailed thereby.

Briefly stated, these objects are attained in an in-line contactor in which the wastewater to be treated is propelled by a pump external to the contactor through a succession of stages, the first being an input section having a converging nozzle that projects the stream at high velocity into a throat coupled to a disinfectant supply such as a chlorinator.

The throat directs the stream in a turbulent state to the inlet of an elongated mixing section, and the resultant vacuum created within the throat by the high velocity stream acts to educe the disinfectant from the supply into the mixing pipe where it is thoroughly intermingled with the stream to interact quickly with the pathogens therein. The treated stream is discharged from the contactor through a diverging pressure-recovery output section coupled to the outlet of the mixing pipe so that the stream is returned to the line at a much lower dynamic energy level.

OUTLINE OF DRAWINGS

For a better understanding of the invention as well as other objects and further features thereof, reference is made to the following detailed description to be read in conjunction with the accompanying drawings, wherein:

FIG. 1 is a schematic drawing illustrating a wastewater treatment system which includes an in-line contactor in accordance with the invention;

FIG. 2 is a sectional view of the input section, the throat and inlet portion of the mixing pipe of the in-line contactor; and FIG. 3 is a sectional view of the outlet portion of the mixing pipe and the section of the in-line contactor.

DESCRIPTION OF INVENTION

The Disinfection System:

Referring now to FIG. 1, there is shown a wastewater treatment system in accordance with the invention, the system being constituted by a pump 10 which forces a wastewater stream through the successive stages of an in-line contactor in accordance with the invention, generally designated by numeral 11. Associated with contactor 11 is a disinfectant supply 12 which, in practice, may be a chlorinator.

Gaseous chlorine is generally added to water in controlled amounts through orifice flowmeters referred to as chlorinators. For a given dosage, the pressure drop across the orifice is kept constant. In devices that are operated under pressure, this is done by providing a pressure-reducing, pressure-compensating valve that maintains influent pressure at a constant level despite pressure changes in the tank from which the gas is taken. In devices that are operated under vacuum, the drop in pressure across the orifice is regulated by controlling the vacuum at the outlet side of the orifice, the inlet side being under partial vacuum. Some pressure devices or bubblers are based on regulated volumetric displacement of the gas.

In conventional waterwaste treatment systems using chlorine as the disinfectant, measured chlorine gas flow from a chlorinator may be introduced directly into the wastewater through diffusers or it may be dissolved in a small flow of water that passes through the gas-flow-regulating device and carries the solution to the point of application. In a system in accordance with the invention, the disinfectant, whether molecular chlorine or chlorine dioxide in gaseous or aqueous form, is brought into direct contact with the wastewater to be treated, without diffusers or jet pumps.

In order to enhance the interaction between the disinfectant and the wastewater, the in-line contactor creates a high degree of liquid turbulence to promote mixing with the disinfectant. To this end, the in-line contactor includes means to increase the velocity of flow to render it highly turbulent. By definition, a water stream passing through a pipe is rendered turbulent when the flow exceeds a Reynolds number of 4000. Reynolds number is a function of the pipe diameter as well as the density, viscosity and velocity of the liquid.

In a system which includes an in-line contactor in accordance with the invention, the wastewater stream in an upstream line 13 coming from a treatment plant P is propelled by pump 10 through the successive stage of contactor 11. The first stage is an input flow section 14 having a converging nozzle whose inlet diameter matches the diameter of upstream line 13, the diameter progressively decreasing toward a nozzle opening 15 which projects the wastewater stream into a throat 16 leading into the inlet of an elongated mixing pipe 17 whose diameter is small compared to that of inlet line 13. Since the wastewater stream is projected into mixing pipe 17 at high velocity, the stream is now in a highly turbulent state.

Chlorinator 12 is coupled to throat 16 through a lateral port 18. Because the wastewater is forced under pressure through nozzle 15, this creates a high vacuum in throat 16 which acts to aid in the eduction of the chlorine from the chlorinator, the chlorine intermingling with the wastewater in the mixing pipe 17. Because the wastewater is in a highly turbulent state, it has an exceptionally high surface area of exposure in contact with the disinfectant admitted into the same pipe and it very rapidly disperses the disinfectant; hence the interaction of the disinfectant with the pathogens in the wastewater takes place almost instantly to effect a very rapid kill. The usual unwanted side effects are minimized by this arrangement.

The outlet of mixing pipe 17 is coupled to the inlet of a diverging pressure-recovery flow section 19 whose diameter progressively increases toward its outlet. The outlet of output flow section 19 is coupled to a downstream line 20 whose diameter is the same as upstream line 13, so that the treated wastewater stream in the downstream line is no longer in a highly turbulent state.

In-Line Contactor

Referring now to FIG. 2, in an actual embodiment of an in-line contactor, it will be seen that the input flow section 14 which converges to define nozzle 15 is coupled to a cylinder 21 within which a throat 16 is defined. An O-ring 22 serves to effect a seal between cylinder 21 and input section 14. The lateral port 18 of the throat is connected directly to an ejector 23 for aqueous Cl$_2$ addition or directly to the chlorinator by a suitable pipe coupler.

The inlet portion 17A of mixing pipe 17 is inserted into throat 16, pipe 17 being in axial alignment with input section 14. Pipe 17 is secured to cylinder 21 by a coupling nut 24. The adjusted radial position of inlet portion 17A determines the size of the annular orifice 17B. Sealing between mixing pipe 17 and cylinder 21 is effected by an O-ring 25. As an optional feature, one may couple to the inlet portion of mixing pipe 17 a sampling probe 26 which includes a pivot pick-up tube 26A whose inlet is oriented to intercept a small sample of the treated wastewater stream.

As shown in FIG. 3, the outlet portion 17C of mixing pipe 17 is coupled to the diverging output flow section 19 which functions to recover the pressure and render the stream less turbulent before it is discharged into a downstream line. A second sampling probe 27 may be coupled to the outlet portion of mixing pipe 17 at its junction with the output flow section.

Thus in operation, the wastewater stream to be disinfected is pumped through the successive stages of the inline contactor, the stream in the first stage being projected at high velocity from the nozzle to the inlet of the mixing pipe by way of the throat. Disinfectant from the chlorine supply coupled to the throat is educed into the mixing pipe and intermingled with the turbulent stream therein to kill pathogens in a relatively brief mixing period, the disinfected stream then being discharged from the contactor in a state of lower dynamic energy through its pressure-recovery output section.

While there has been shown and described a preferred embodiment of an in-line disinfectant contactor in accordance with the invention, it will be appreciated that many changes and modifications may be made therein without, however, departing from the essential spirit thereof.

I claim:

1. A wastewater treatment system operating in conjunction with a wastewater treatment plant whose effluent is a stream of wastewater; said system being provided with an in-line contactor adapted to bring about intimate contact between a disinfectant and the wastewater stream to react the disinfectant with pathogens in the wastewater in a manner effecting rapid and efficient kills with minimal unwanted side effect and pump means to force said stream into the contactor under pressure, said contactor stream into the contactor under pressure, said contactor comprising:

A. an input flow section having a predetermined internal diameter through which the stream to be treated is forced under pressure, said section having a converging nozzle which projects the stream forwardly at high velocity; said treated effluent being fed to the inlet of said input flow section by an upstream line whose diameter matches the diameter of the inlet to the input section;

B. a throat surrounding the nozzle and including a lateral port coupling the throat to a disinfectant supply in the form of molecular chlorine;

C. an elongated mixing pipe in axial alignment with said input section and having a uniform internal diameter which is small relative to said predetermined diameter, the inlet of the pipe being coupled to said throat to receive the projected stream, the velocity of which is such as to render the stream highly turbulent in the pipe, the projected stream creating a vacuum in the throat educing disinfectant from the supply which is intermingled with the turbulent stream in said pipe to effect the desired disinfection thereof, said mixing pipe being axially shiftable relative to said throat to adjust the position of said pipe inlet with respect to said lateral port; and D. a diverging, pressure-reducing output flow section coupled to the outlet of said pipe and in axial alignment therewith, whereby the disinfected wastewater stream is discharged in a less-turbulent condition from the contactor, the outlet of said output flow section having a diameter which matches that of a downstream line coupled thereto and which also matches the diameter of the upstream line coupled thereto.

2. A contactor as set forth in claim 1, wherein said molecular chlorine is dissolved in a water carrier.

* * * * *